(12) United States Patent
Gluck

(10) Patent No.: US 10,988,194 B1
(45) Date of Patent: Apr. 27, 2021

(54) BICYCLE SADDLE

(71) Applicant: Lewis Gluck, Farmingdale, NY (US)

(72) Inventor: Lewis Gluck, Farmingdale, NY (US)

(*) Notice: Subject to any disclaimer, the term of this patent is extended or adjusted under 35 U.S.C. 154(b) by 9 days.

(21) Appl. No.: 16/590,409

(22) Filed: Oct. 2, 2019

(51) Int. Cl.
*B62J 1/00* (2006.01)
*B62J 1/28* (2006.01)

(52) U.S. Cl.
CPC ............. *B62J 1/007* (2013.01); *B62J 1/005* (2013.01); *B62J 1/28* (2013.01)

(58) Field of Classification Search
None
See application file for complete search history.

(56) References Cited

U.S. PATENT DOCUMENTS

| | | | |
|---|---|---|---|
| 620,688 A | 3/1899 | Wood | |
| 4,363,516 A * | 12/1982 | Braly | B62J 1/28 297/215.1 |
| 4,512,608 A | 4/1985 | Erani | |
| 6,050,584 A * | 4/2000 | Sibson | B62J 1/28 280/283 |
| 6,113,057 A * | 9/2000 | Cheng | B62J 1/04 248/594 |
| 6,129,251 A * | 10/2000 | Lajoie | A01K 97/10 224/197 |
| 6,206,399 B1 * | 3/2001 | Schnitzenbaumer | B62J 1/28 280/304.4 |
| 7,537,233 B2 * | 5/2009 | Huang | B62J 1/28 280/282 |
| 8,011,725 B2 * | 9/2011 | Andrews | B62J 1/28 297/215.12 |
| 2004/0056519 A1 | 3/2004 | Kastarlak | |
| 2005/0173951 A1 | 8/2005 | Jalkanen | |
| 2006/0181136 A1 * | 8/2006 | Gaffney | B62J 1/28 297/487 |
| 2010/0187873 A1 * | 7/2010 | Geyer | B62J 1/28 297/215.13 |
| 2015/0321718 A1 | 11/2015 | Chang | |
| 2016/0068212 A1 * | 3/2016 | Hamel | B62J 1/007 297/201 |
| 2017/0073028 A1 | 3/2017 | Petty | |

(Continued)

FOREIGN PATENT DOCUMENTS

| KR | 100935441 | 1/2010 | | |
|---|---|---|---|---|
| KR | 20160074372 | 6/2016 | | |
| WO | WO-2014130001 A1 * | 8/2014 | ............. | B62M 1/32 |

*Primary Examiner* — David E Allred
(74) *Attorney, Agent, or Firm* — Law Offices of Michael L. Wise, LLC

(57) ABSTRACT

A novel bicycle saddle design comprises a post, a connecting arm, a seat, and a forward support. The connecting arm is attached to the post, and the seat is attached to the connecting arm. The forward support is attached to the connecting arm and is positionable forward of and in spaced relation to the seat. The forward support is also positionable so as to press against a rider lateral to and above the genitals of the rider while the rider is seated on the seat and peddling a bicycle. In such a manner, the bicycle saddle provides a noseless saddle design that prevents the rider from sliding forward off the seat while also enhancing the rider's ability to stabilize, maneuver, and handle the bicycle. Without a nose, pressure on and compression of the nerves and arteries at the rider's perineum are essentially eliminated, mitigating the health issues of prior-art saddle designs.

18 Claims, 10 Drawing Sheets

(56) References Cited

U.S. PATENT DOCUMENTS

2017/0079440 A1* 3/2017 Todd ................... B62J 1/007
2018/0304947 A1* 10/2018 Hsu ..................... B62J 1/10
2018/0304948 A1* 10/2018 Hsu ..................... B62J 1/005

* cited by examiner

Fig. 7
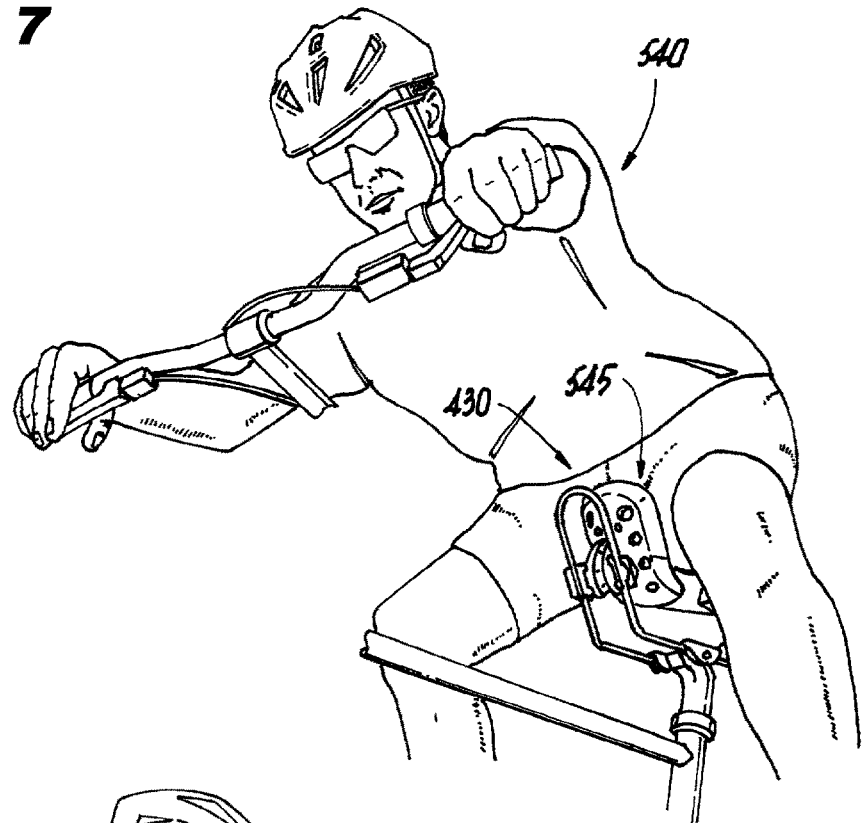
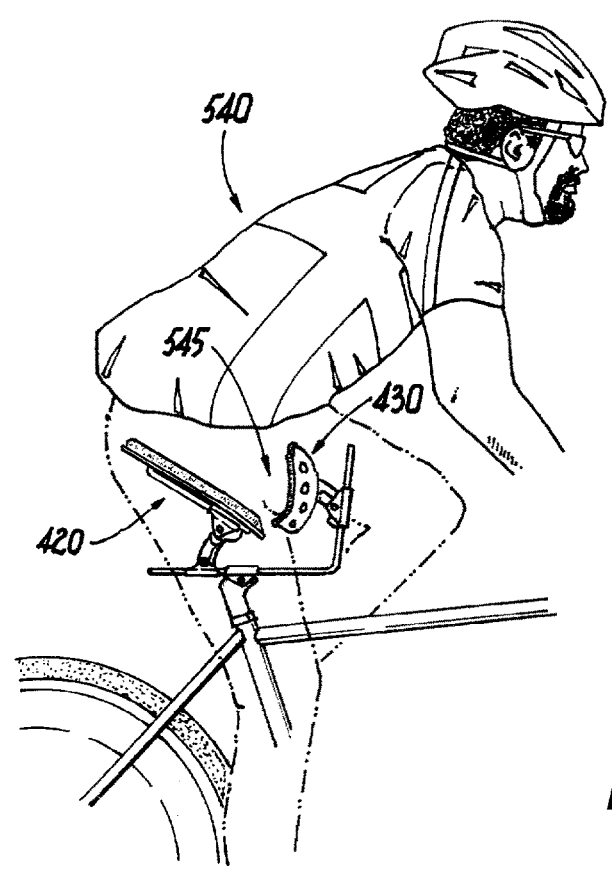
Fig. 8

BICYCLE SADDLE

FIELD OF THE INVENTION

The present invention relates generally to land vehicles for travelling, and, more particularly, to saddles or other seats for bicycles.

BACKGROUND OF THE INVENTION

A typical modern bicycle saddle (i.e., bicycle seat) includes a main portion on which the rider places his buttocks and a narrow nose or horn that protrudes forward from the main portion so that it underlies the rider's groin as the rider straddles the saddle. FIG. 1 shows a perspective view of a rider 100 riding a bicycle 105 with a typical bicycle saddle 110. With such a saddle, some 25% or more of the rider's body weight is typically supported where the groin contacts the saddle nose. This percentage may increase as the rider leans forward to achieve aerodynamic positions.

Despite their widespread usage, bicycle saddles that include noses may cause sexual and reproductive health issues such as genital numbness, erectile dysfunction, and even impotence. FIG. 2 shows a plan-view diagrammatic representation of some of the arteries and nerves located at a human male's perineum 200 (the region between the anus 205 and the sex organs 210), while FIG. 3 shows a side view of the same anatomical region. The typical bicycle saddle nose may place pressure on and compress the pudendal nerves 215 (including the perineal nerves 220) and the inferior rectal nerves 225. At the same time, the saddle nose may press against the pudendal artery 230 (including the perineal artery 235) and the inferior rectal artery 240. Loss of sensation and decreased blood supply may result.

Several solutions have been developed to address the shortcomings of conventional nose-based bicycle saddles. A first solution includes, for example, placing a recessed channel, groove, or depression longitudinally down the center of the saddle to try and relieve pressure on the center of the rider's perineum. Nevertheless, this solution is typically not effective given that critical arteries and nerves are not longitudinally centered on the rider, and the seat continues to compress these arteries and nerves despite its split design. In fact, such split saddles may actually make things worse since they tend to focus the pressure more narrowly on the rider. A second solution is to remove the nose of the saddle to create a "noseless" or "no-nose" saddle. However, here too, disadvantages remain. The absence of a nose tends to give the rider the impression that he is sliding forward off the seat, and also compromises stability, maneuverability, and the handling of the bicycle because the rider is not as physically engaged with the saddle. Thus, many serious bicycle riders do not consider noseless bicycle saddles to be a viable option, and these seats are not particularly popular or are only reluctantly accepted.

For the foregoing reasons, there is a need for alternative bicycle seat designs that address the many shortcomings set forth above.

SUMMARY OF THE INVENTION

Embodiments of the present invention address the above-identified need by providing new bicycle saddle designs that are noseless but do not suffer the several disadvantages of noseless saddle designs.

Aspects of the invention are directed to a bicycle saddle for use with a bicycle, the bicycle saddle comprising a post, a connecting arm, a seat, and a forward support. The connecting arm is attached to the post, and the seat is attached to the connecting arm. The forward support is attached to the connecting arm and is positionable forward of and in spaced relation to the seat. The forward support is also positionable so as to press against a rider lateral to and above the genitals of the rider while the rider is seated on the seat and peddling a bicycle.

Additional aspects of the invention are directed to a bicycle comprising a post, a connecting arm, a seat, and a forward support. The post is supported by the bicycle. The connecting arm is attached to the post, and the seat is attached to the connecting arm. The forward support is attached to the connecting arm and is positionable forward of and in spaced relation to the seat. The forward support is also positionable so as to press against a rider lateral to and above the genitals of the rider while the rider is seated on the seat and peddling the bicycle.

Even additional aspects of the invention are directed to a bicycle saddle for use with a bicycle, the bicycle saddle comprising a post, a primary connecting arm, a secondary connecting arm, a seat, and a forward support. The primary connecting arm is attached to the post, and the seat is attached to the primary connecting arm. The secondary connecting arm is hingedly attached to the primary connecting arm, and the forward support is attached to the secondary connecting arm and is positionable forward of an in spaced relation to the seat. The forward support is also positionable so as to press against a rider lateral to and above the genitals of the rider while the rider is seated on the seat and peddling a bicycle.

Advantageously, embodiments in accordance with aspects of the invention provide a noseless bicycle saddle that prevents the rider from sliding forward off the seat while also enhancing the rider's ability to stabilize, maneuver, and handle the bicycle. Embodiments of the invention also allow a rider to generate greater peddling force and to achieve more efficient peddling effort when compared to prior-art designs.

BRIEF DESCRIPTION OF THE DRAWINGS

These and other features, aspects, and advantages of the present invention will become better understood with regard to the following description, appended claims, and accompanying drawings where:

FIGS. 7 and 8 show forward and side perspective views, respectively, of the FIG. 4 bicycle saddle in use while a rider is peddling the bicycle;

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

Figure 1:
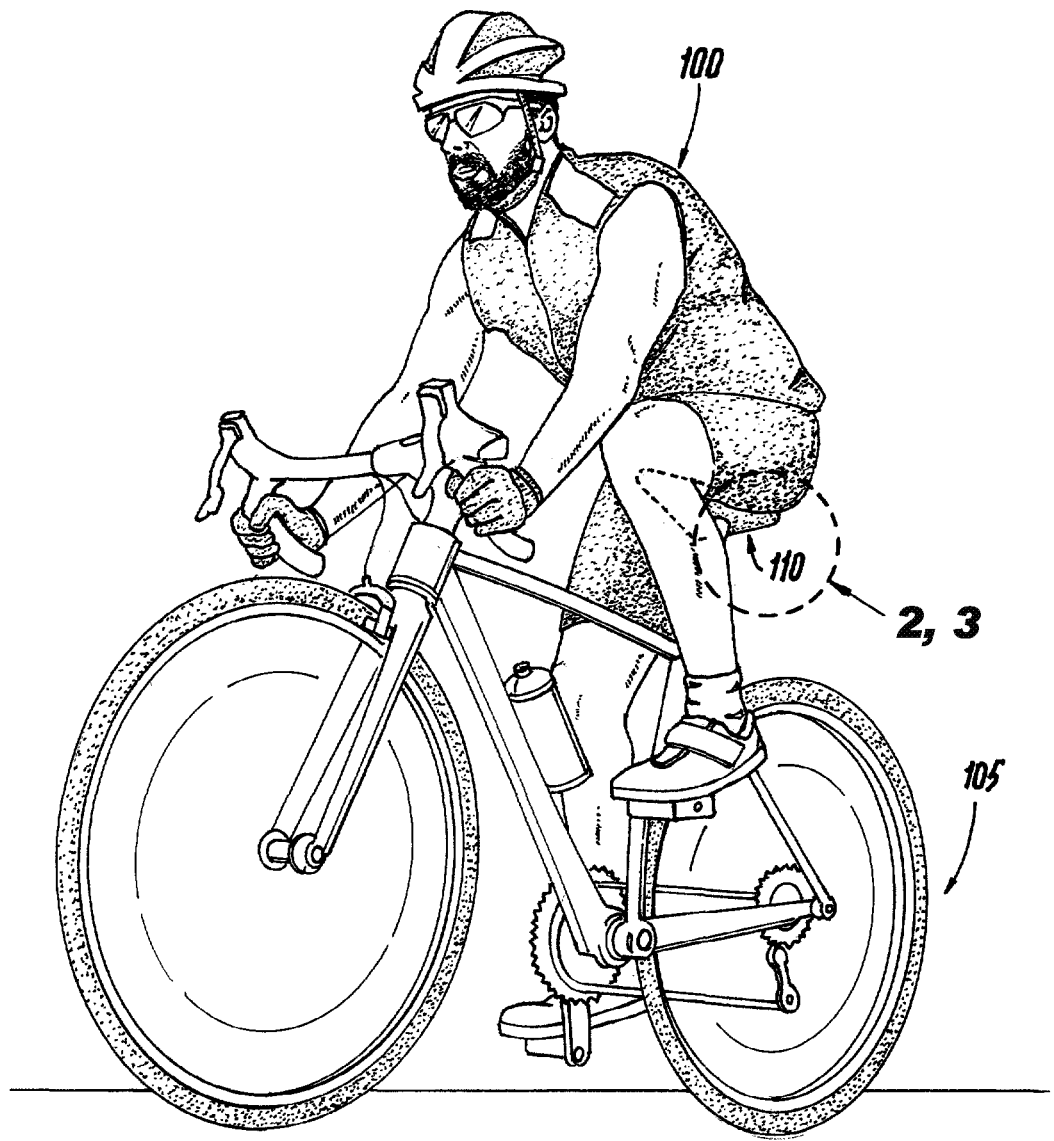
FIG. 1 shows a perspective view of a rider riding a bicycle with a typical bicycle saddle.
Figure 2:
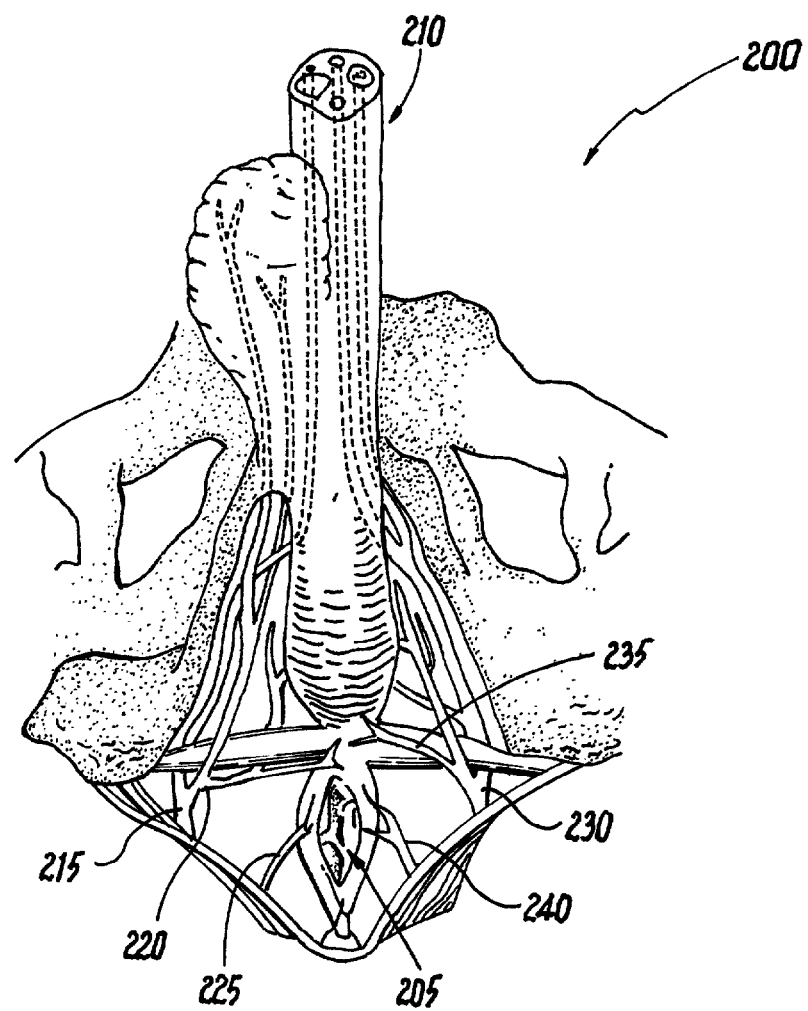
FIGS. 2 and 3 show plan view and side view diagrammatic representations, respectively, of some of the arteries and nerves located at a human male's perineum.
Figure 3:
Figure 4:
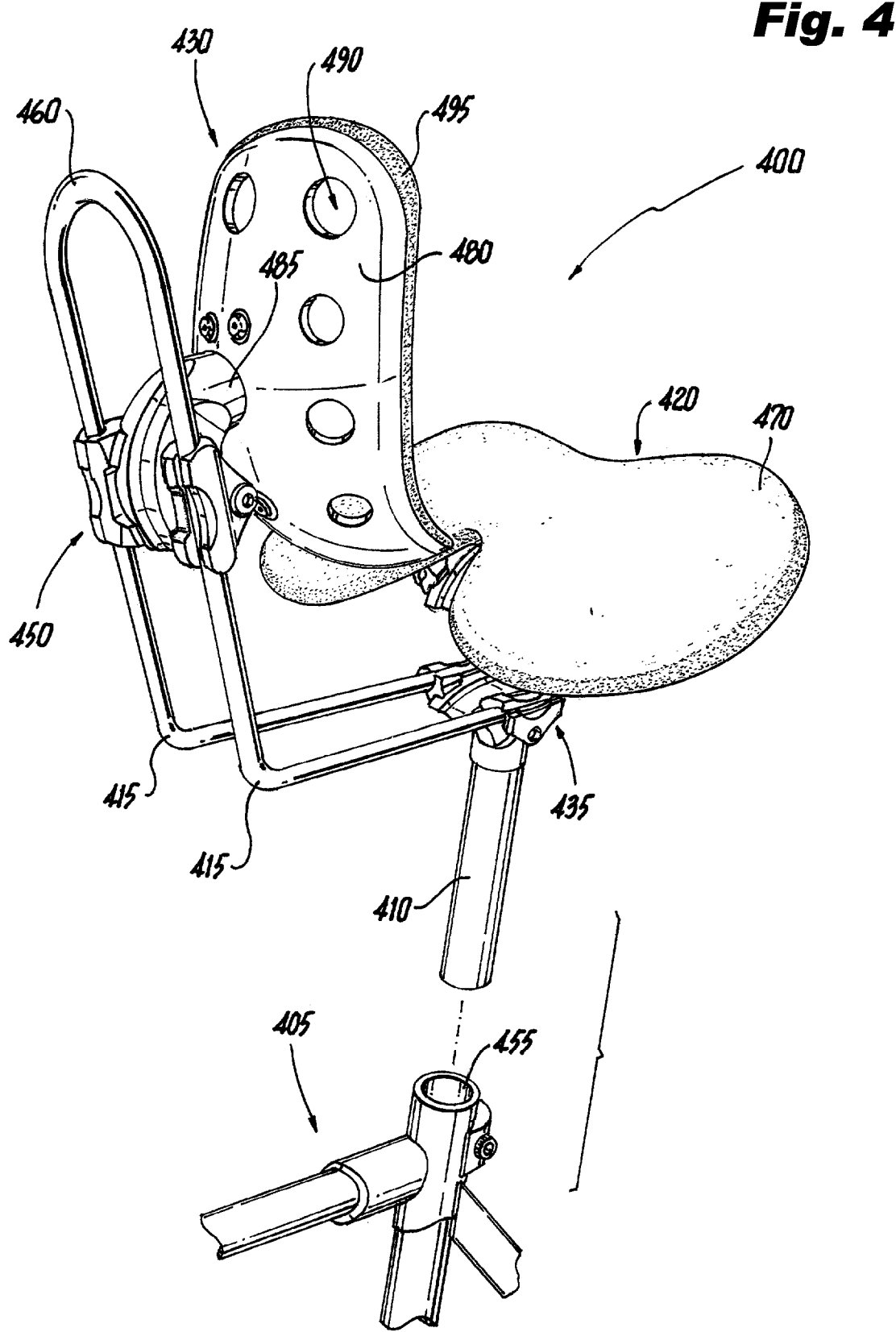
FIG. 4 shows a perspective view of a bicycle saddle in association with a bicycle, in accordance with an illustrative embodiment of the invention.
Figure 5:
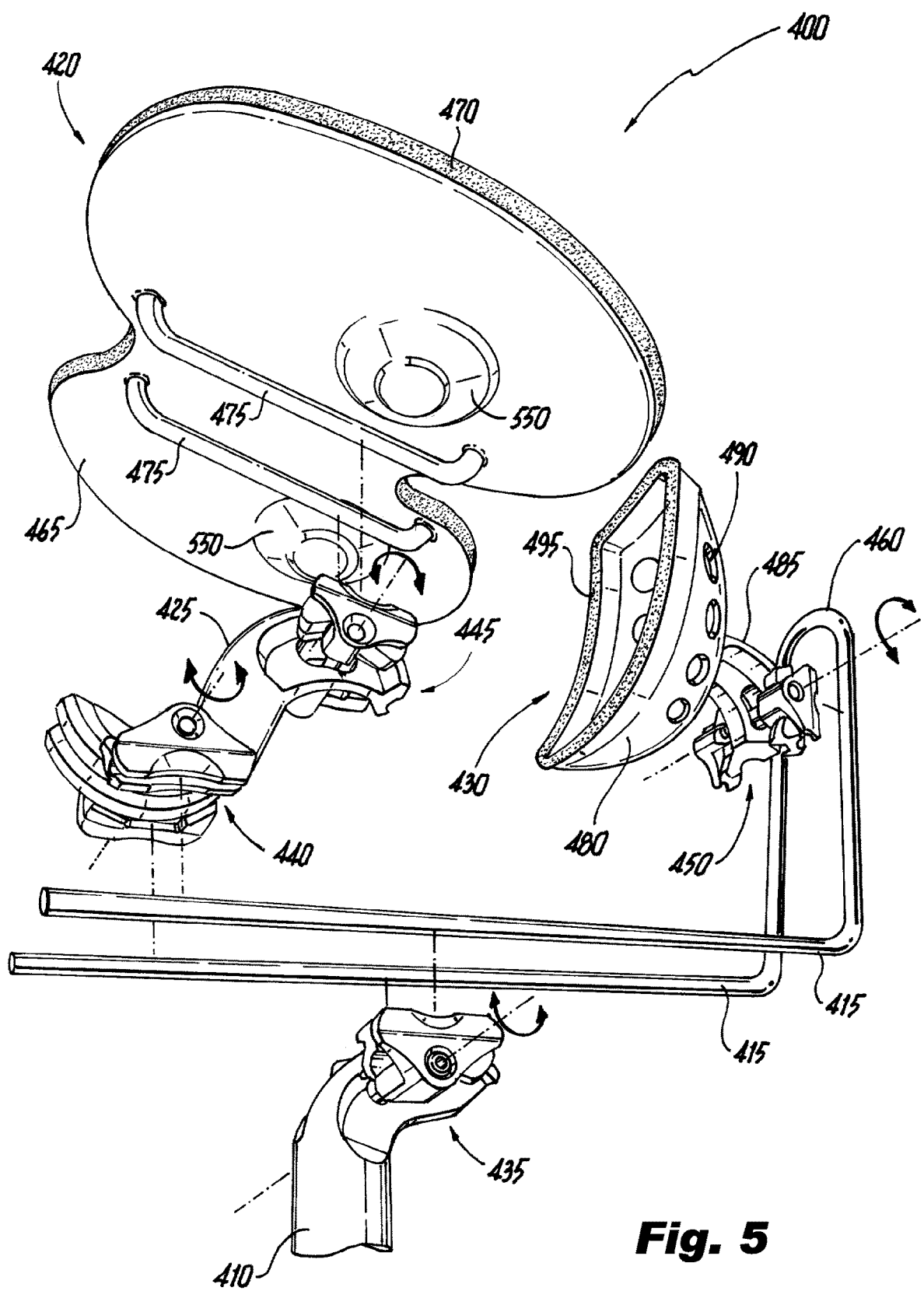
FIG. 5 shows an exploded perspective view of the FIG. 4 bicycle saddle.

FIGS. 4 and 5 show aspects of a bicycle saddle 400 in accordance with an illustrative embodiment of the invention. FIG. 4 shows a perspective view of the bicycle saddle 400 in association with a bicycle 405, while FIG. 5 shows an exploded perspective view of the bicycle saddle 400 alone.

The illustrative bicycle saddle 400 includes a post 410, a pair of primary rods 415, a seat 420, a seat support 425, a forward support 430, and four adjustable brackets. The four adjustable brackets include an adjustable seat post bracket 435, a lower adjustable seat bracket 440, an upper adjustable seat bracket 445, and adjustable forward support bracket 450.

The lower portion of the post 410 is insertable into a tube 455 in the bicycle 405. The top of the post 410 is attached to the pair of primary rods 415 via the adjustable seat post bracket 435. The pair of primary rods 415 run parallel to each other under the seat 420 and then turn upward after passing beneath the forward support 430. After running parallel for a majority of their travel, the pair of primary rods 415 are joined together by a loop 460 near their top.

The seat 420 includes a seat pan 465 covered by an elastic pad 470. Two parallel seat rods 475 are attached to the bottom of the seat pan 465 opposite the elastic pad 470. The seat 420 is coupled to the pair of primary rods 415 via the seat support 425, the lower adjustable seat bracket 440, and the upper adjustable seat bracket 445, which attach to the two parallel seat rods 475. The seat support 425 in the present, non-limiting embodiment is s-shaped, with the lower adjustable seat bracket 440 at one terminus and the upper adjustable seat bracket 445 at the other.

The forward support 430 includes a cup 480 resembling an athletic cup attached to a forward support horn 485 that emerges from the front of the cup 480. The cup 480 includes a plurality of holes 490 for ventilation and a cushioned rim 495. The adjustable forward support bracket 450 attaches the forward support 430 to the pair of primary rods 415. The pair or primary rods 415 in the bicycle seat 400 thereby serve as a connecting arm between the seat 420 and the forward support 430.

Figure 6:
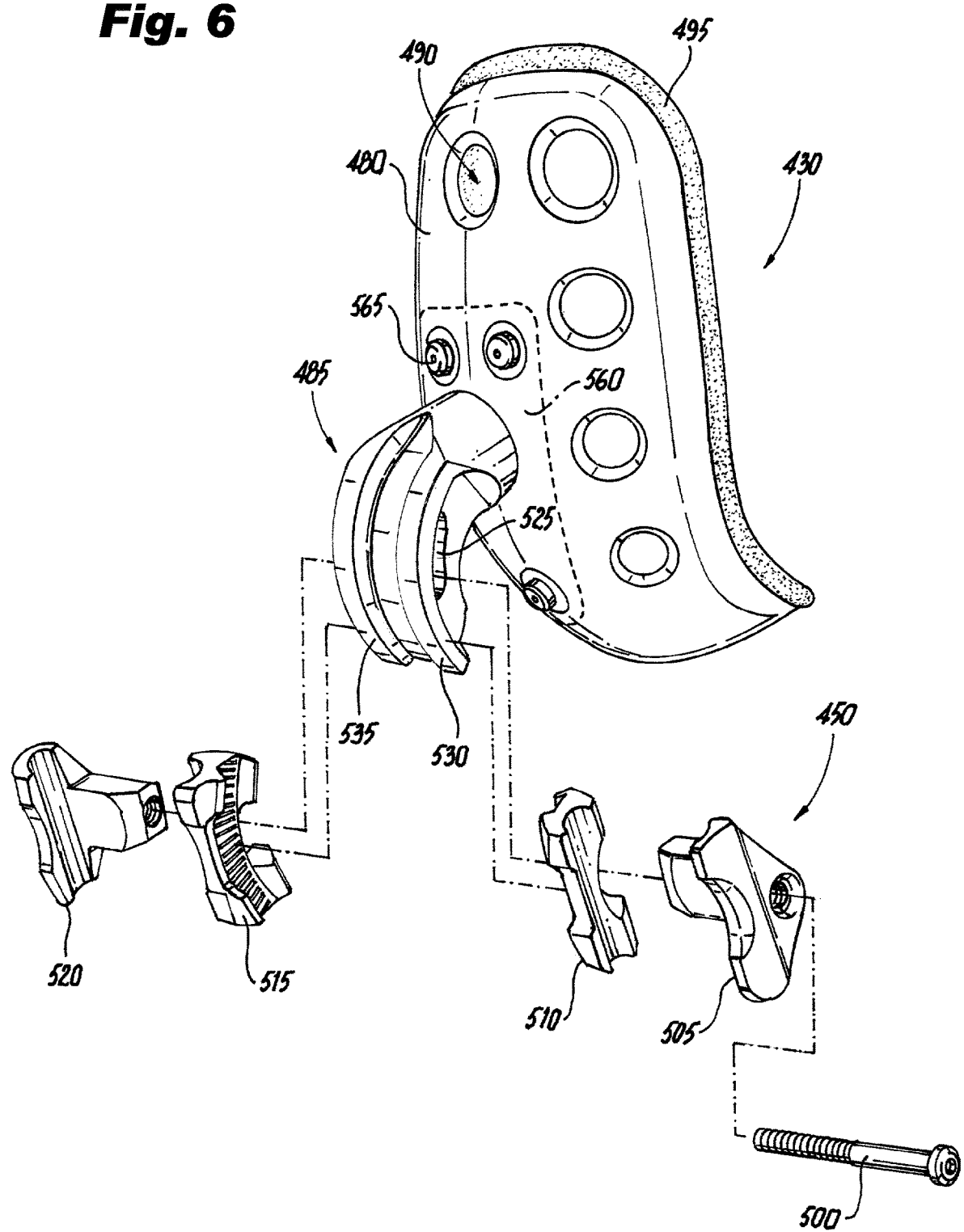
FIG. 6 shows an exploded view of the forward support and the adjustable forward support bracket in the FIG. 4 bicycle saddle.

All four of the adjustable brackets, namely, the adjustable seat post bracket 435, the lower adjustable seat bracket 440, the upper adjustable seat bracket 445, and the adjustable forward support bracket 450 are largely identical and work on the same principle. FIG. 6 shows an exploded perspective view of the forward support 430 and the adjustable forward support bracket 450, and provides an example by which to understand all four of the adjustable brackets 435, 440, 445, 450. The adjustable forward support bracket 450 includes a bolt 500, a rightmost bracket portion 505, an intermediate right bracket portion 510, an intermediate left bracket portion 515, and a leftmost bracket portion 520. The adjustable forward support bracket 450 is designed to couple to the forward support horn 485, which defines a curved slot 525, a right curved guide 530, and a left curved guide 535. In use, one of the pair of primary rods 415 is placed between the rightmost bracket portion 505 and the intermediate right bracket portion 510, while the remaining one of the pair of primary rods 415 is placed between the leftmost bracket portion 520 and the intermediate left bracket portion 515. In this manner, each of the pair of primary rods 415 may be separately clamped by the adjustable forward support bracket 450. At the same time, the rightmost and leftmost bracket portions 510, 520 align at opposite sides of the curved slot 525 in the forward support horn 485 while they simultaneously press the intermediate right bracket portion 510 against the right curved guide 530 on the forward support horn 485 and press the intermediate left bracket portion 515 against the left curved guide 535 on the forward support horn 485. The bolt 500, in turn, passes through the rightmost bracket portion 505 and the curved slot 525, and is threaded into the leftmost bracket portion 520, and, in so doing, compressively holds all these elements together when adequately tightened.

When the bolt 500 is somewhat loose, the forward support 430 is able to slide up and down on the pair of primary rods 415, while also being able to be translated along the right and left curved guides 530, 535 on the forward support horn 485. The adjustable forward support bracket 450 thereby provides several degrees of adjustability to the forward support 430, including up and down directions, as well as forward and rearward pitch directions. Conversely, with the bolt 500 tightened via, for example, a hex key, the selected configuration is securely locked in place. Given that the remaining three adjustable brackets 435, 440, 445 provide similar degrees of adjustability to other elements of the bicycle saddle 400, one can readily recognize that the bicycle saddle 400 may be adjusted to accommodate almost any rider's anatomy and preferences.

FIGS. 7 and 8 show forward and side perspective views, respectively, of the illustrative bicycle saddle 400 in use while a rider 540 is peddling the bicycle 405. In FIG. 8, the rider's legs are shown in phantom to allow the bicycle saddle 400 and its relationship to the rider 540 to be more easily discerned. While in use, the rider 540 is seated on the seat 420 while pressed forward against the forward support 430. The forward support 430, in turn, is positioned against the rider 540 both lateral to, and above, the genitals 545 of the rider. As used herein, the word "genitals" means the external reproductive organs of a rider, and refers to both male and female riders.

Figure 9:
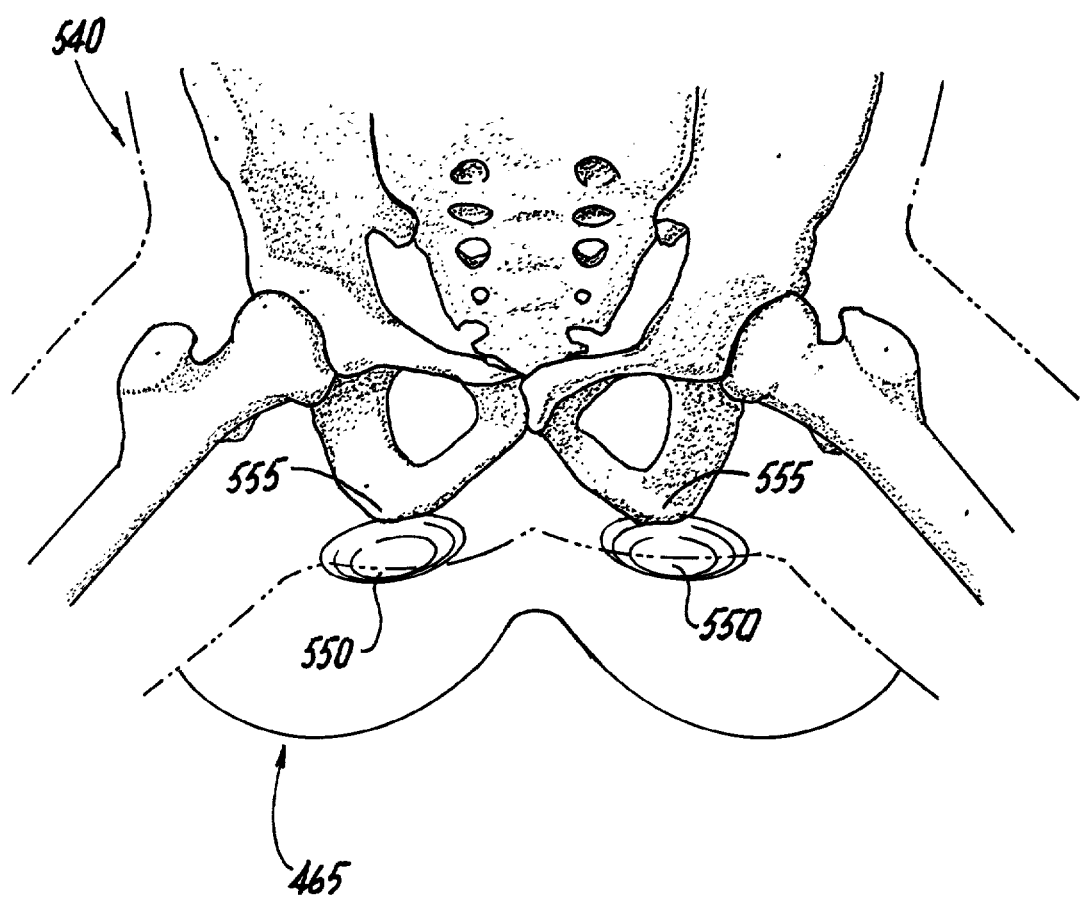
FIG. 9 shows a diagrammatic representation of a rider's pelvic girdle with respect to a seat pan in the FIG. 4 bicycle saddle.

Reference to FIGS. 4 and 5 show that the seat pan 465 in the present embodiment includes a pair of depressions 550 that correspond to the positions of the rider's sit bones (i.e., ischial tuberosity) while the rider 540 is seated on the seat. This configuration is reinforced by FIG. 9, which shows a diagrammatic representation of a rider's pelvic girdle with a pair of sit bones 555 aligned with the pair of depressions 550 in the seat pan 465. As a result of this alignment, pressure is reduced on the rider's pelvic region while using the illustrative bicycle saddle 400. It is therefore anticipated that the rider 540 will be able to ride longer and in more comfort with these features.

The illustrative bicycle saddle 400, and more generally, bicycle saddles in accordance with aspects of the invention, thereby provide a rider with a noseless saddle while also providing forward support on the rider that keeps from sliding forward off the seat. The rider therefore has a sense of being fully engaged with the seat, and the rider's ability to stabilize, maneuver, and handle the bicycle is unimpeded despite the lack of a "nose." Importantly, without a nose, pressure on and compression of the nerves and arteries at the rider's perineum are essentially eliminated. The forward support is also ideally positioned so that it does not interfere with the motion of the rider's legs as the rider peddles the bicycle. In this manner, embodiments of the invention also allow a rider to generate greater peddling force and achieve more efficient peddling effort when compared to prior-art designs. Extensive adjustability of the bicycle saddle accommodates almost any rider's anatomy and preferences, both for male and female riders.

Once understood from the descriptions provided herein, the manufacture of the illustrative bicycle saddle 400 will be within the skill of one having ordinary skill in the relevant manufacturing arts. The seat pan 465, for example, may be formed from steel, aluminum, or reinforced-resin carbon fiber using conventional material forming skills. At the same time, several of the components may be formed by modifying off-the-shelf parts. For example, the seat support 425 and the forward support horn 485 may be formed by modifying (e.g., cutting, joining) conventional seat posts available from SPECIALIZED® Bicycle Components, Inc. (Morgan Hill, Calif., USA, where SPECIALIZED is a registered United States trademark). The associated adjustable brackets 435, 440, 445, 450 may also be purchased from the same company. The cup 480 may be purchased as a conventional athletic cup and then modified to attach to the forward support horn 485. In one or more embodiments, for example, the forward support horn 485 may be modified to terminate in a plate 560 that sits inside the cup 480 and receives four bolts 565 that pass through the cup 480 to affect the attachment between the cup 480 and the forward support horn 485 (see FIG. 6).

It should again be emphasized that the above-described embodiments of the invention are intended to be illustrative only. Other embodiments can use different types and arrangements of elements for implementing the described functionality. These numerous alternative embodiments within the scope of the appended claims will be apparent to one skilled in the art. The spirit and scope of the appended claims should not be limited solely to the description of the preferred embodiments contained herein.

Figure 10:
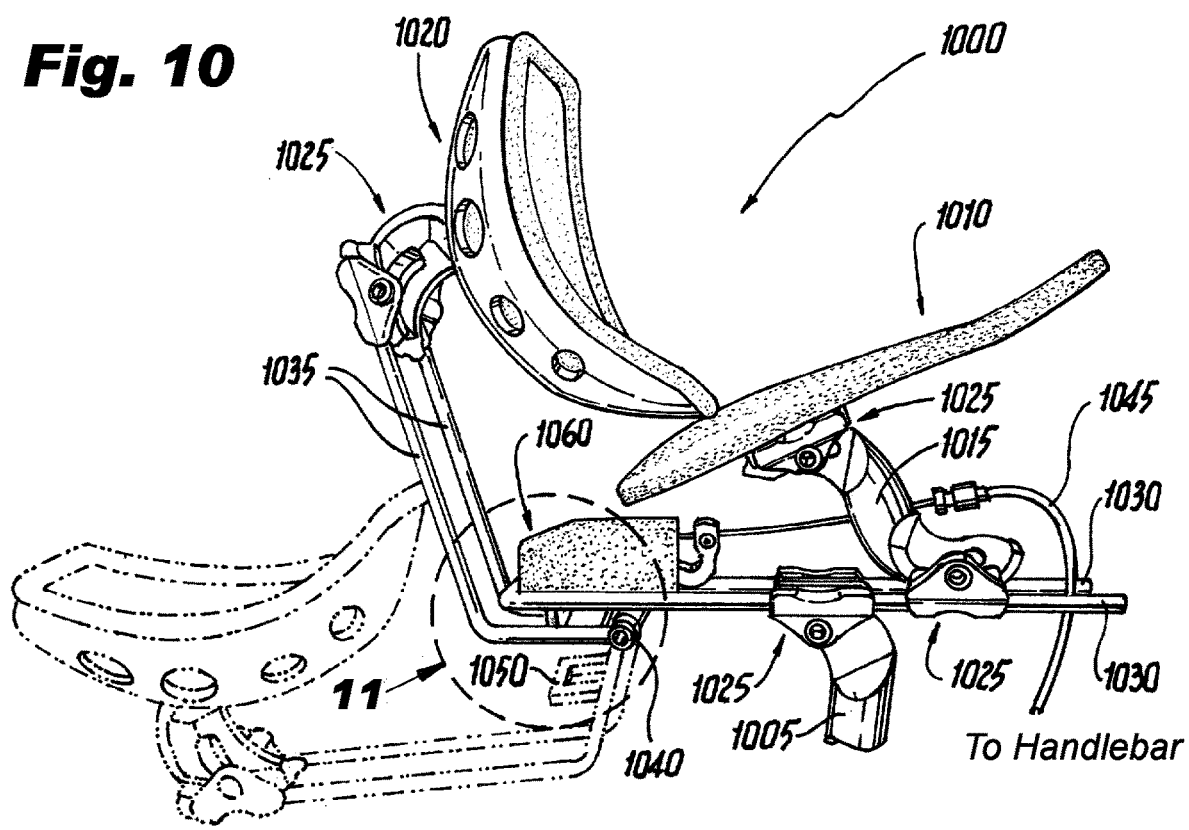
FIG. 10 shows a side perspective view of an alternative bicycle saddle in accordance with a second illustrative embodiment of the invention.
Figure 11:
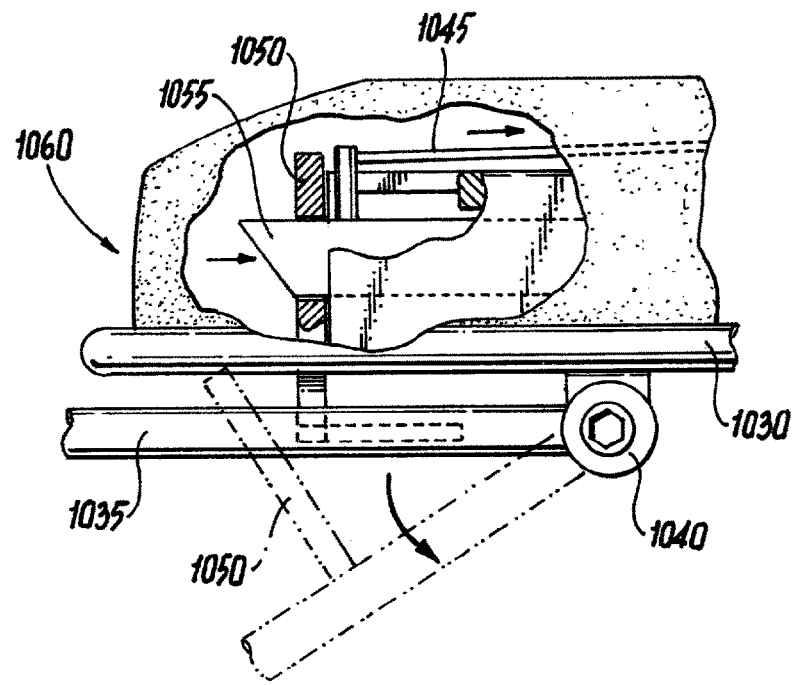
FIG. 11 shows a partially broken side view of the region of the alternative bicycle saddle shown in FIG. 10.

FIGS. 10 and 11, for example, show aspects of an alternative bicycle saddle 1000 in accordance with a second illustrative embodiment of the invention. FIG. 10 shows a side perspective view of the alternative bicycle saddle 1000, while FIG. 11 shows a partially broken view of the region of the alternative bicycle saddle 1000 indicated in FIG. 10.

The alternative bicycle saddle 1000 includes a post 1005, a seat 1010, a seat support 1015, a forward support 1020, and four adjustable brackets 1025, all of which are similar to those shown with reference to FIGS. 4-6. However, in the alternative bicycle saddle 1000, the pair of primary rods is broken into two parts with a hinging mechanism in between. More particularly, a pair of primary rods 1030 is attached to the post 1005, and a pair of secondary rods 1035 is hingedly attached to the pair of primary rods 1030 via a hinge 1040. This allows the forward support 1020 to be rotated out of the way when getting on a bicycle, and then locked back into place in the upright position when the rider is positioned on the seat 1010. When getting off the bicycle, the rider can again rotate the forward support 1020 out of the way.

Locking and unlocking of the forward support 1020 to allow the above-described functionality is via a locking mechanism that is actuated by a cable 1045 that runs to the handlebars of the bicycle. The pair of secondary rods 1035 is attached to a u-shaped receiver 1050 that engages with a sliding latch 1055. When the cable 1045 is actuated, the sliding latch 1055 withdraws from the u-shaped receiver, unlocking the forward support 1020 and allowing it to be rotated out of the way. Later, when the rider wishes to lock the forward support 1020 in the upright position, the rider places the forward support 1020 in the upright position and again actuates the cable 1045 to insert the sliding latch 1055 into the u-shaped receiver 1050 and lock the forward support 1020 in place. In other embodiments, a spring may also be added to the locking mechanism that biases the sliding latch 1055 in the forward direction to help actuate the sliding latch 1055 in its locking position. A cover 1060 covers the sliding latch 1055 and its associated mechanism.

Figure 12:
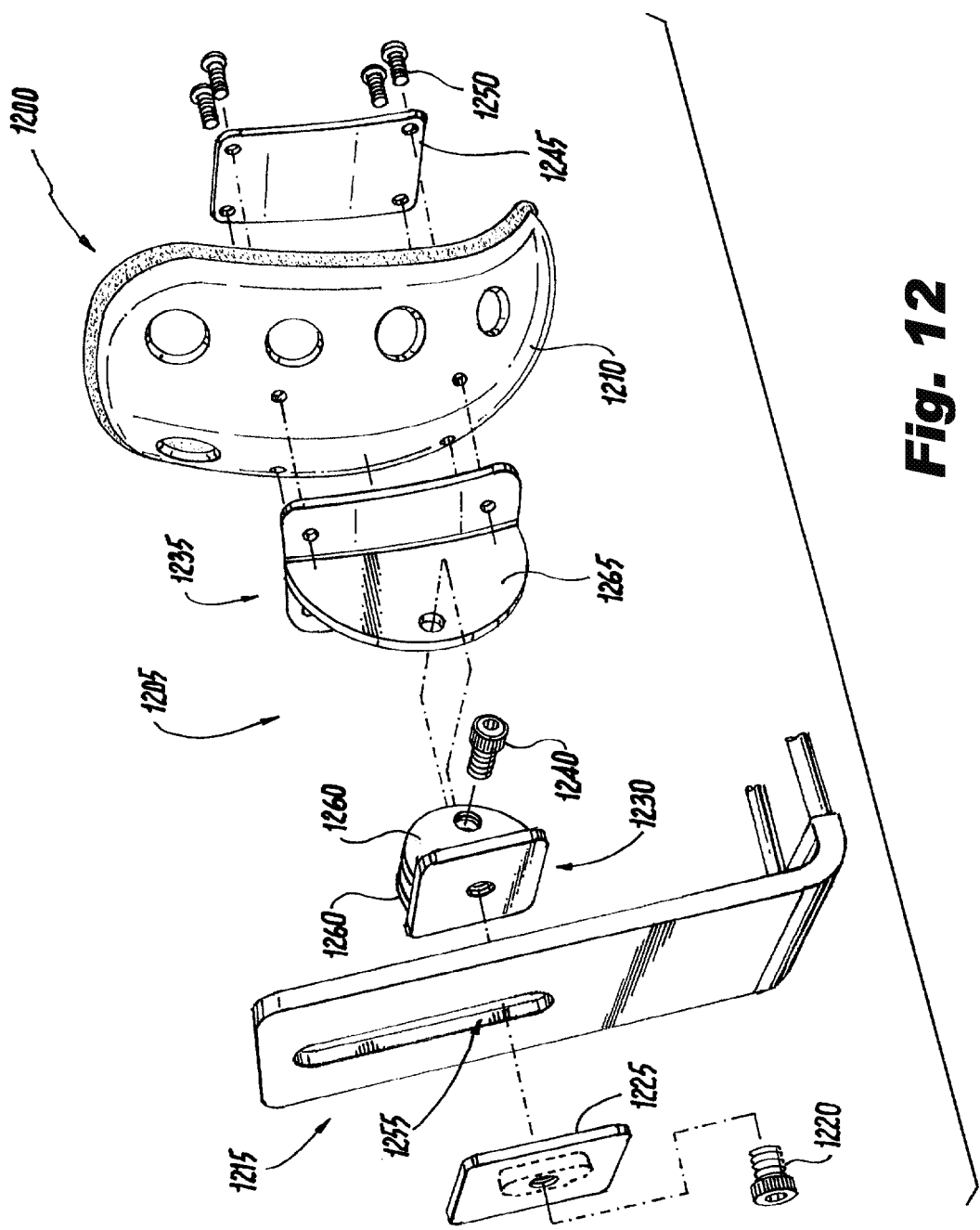
FIG. 12 shows an exploded perspective view of a forward portion of an alternative bicycle saddle in accordance with a third illustrative embodiment of the invention.

While the pair of primary rods 415 form the connecting arm between the seat 420 and the forward support 430 in the bicycle saddle 400, alternative embodiments in accordance with aspects of the invention may utilize different designs. FIG. 12 shows an exploded perspective view of the forward portion of an alternative bicycle saddle 1200 in accordance with a third illustrative embodiment of the invention. Like the bicycle saddle 400, the alternative bicycle saddle 1200 includes a forward support 1205 with a cup 1210 that is attached to the remainder of the alternative bicycle saddle 1200 via a connecting arm. However, in the alternative bicycle saddle 1200, the connecting arm defines a tongue 1215 forward of the forward support 1205 rather than a pair of rods in the manner of the bicycle saddle 400.

Attachment of the forward support 1205 to the tongue 1215 in the alternative bicycle saddle 1200 is via a several connecting elements, namely: a height-adjustment bolt 1220, a height-adjustment plate 1225, a forward pitch-adjustment element 1230, a rearward pitch-adjustment element 1235, a pitch-adjustment bolt 1240, a rearward plate 1245, and four fixating bolts 1250. A portion of the height-adjustment plate engages a slot 1255 in the tongue 1215 and abuts against the forward pitch-adjustment element 1230 so that portions of the height-adjustment plate 1225 and the forward pitch-adjustment element 1230 occupy opposite sides of the tongue 1215. The height-adjustment bolt 1220 passes through a threaded opening in the height-adjustment plate 1225 into a threaded opening in the forward pitch-adjustment element 1230 and thereby acts to hold these two features together. At the same time, distinct lateral arc-shaped plates 1260 on the forward pitch-adjustment element 1230 fall on either side of a central arc-shaped plate 1265 on the rearward pitch-adjustment element 1235. The pitch-adjustment bolt 1240 passes through respective threaded openings in each of the lateral arc-shaped plates 1260 and an unthreaded opening in the central arc-shaped plate 1265. Finally, the rearward pitch-adjustment element 1235 is attached to the cup 1210 via the rearward plate 1245 and the four fixating bolts 1250.

In use, the height-adjustment bolt 1220 may be loosened to allow the forward support 1205 to be slid up and down in the slot 1255 of the tongue 1215 until the desired vertical position is reached, after which, the height-adjustment bolt 1220 may be tightened to lock the forward support 1205 in that position. Likewise, the pitch-adjustment bolt 1240 may also be loosened to allow the pitch of the forward support 1205 to be adjusted, at which point, it too can be tightened to lock in that positioning. The forward support 1205 of the alternative bicycle saddle 1200 thereby has adjustability both in height and in pitch.

Figure 13:
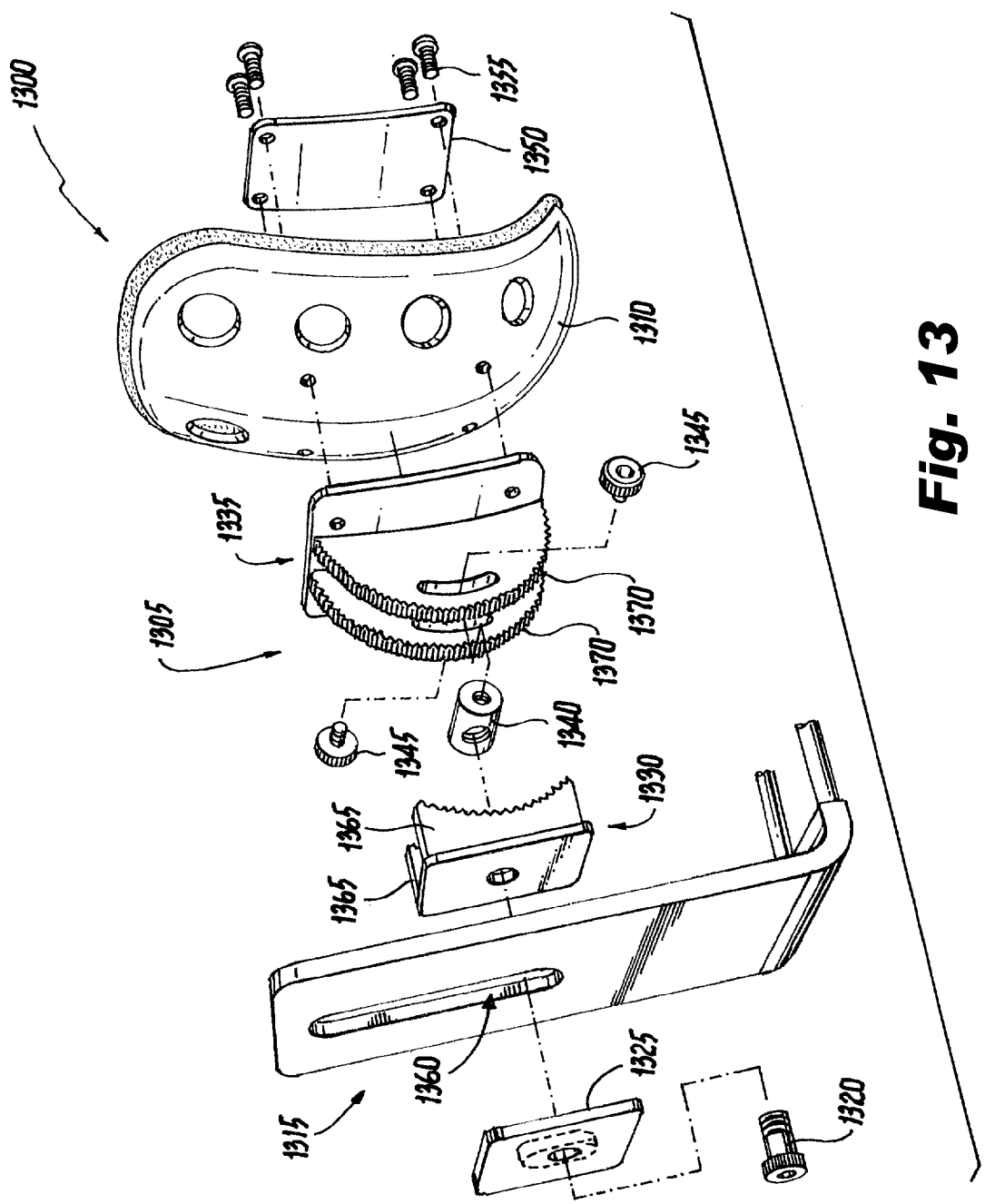
FIG. 13 shows an exploded perspective view of a forward portion of an alternative bicycle saddle in accordance with a fourth illustrative embodiment of the invention.

FIG. 13 shows an exploded perspective view of an alternative bicycle saddle 1300 in accordance with a fourth illustrative embodiment of the invention. Here again, the alternative bicycle saddle 1300 includes a forward support 1305 with a cup 1310 that is attached to the remainder of the alternative bicycle saddle 1300 via a tongue 1315 positioned forward of the forward support 1305 like that in FIG. 12. However, the connecting elements utilized to connect the forward support 1305 to the tongue 1315 differ from those shown in FIG. 12.

The connecting elements in the alternative bicycle saddle 1300 include: an adjustment bolt 1320, a height-adjustment plate 1325, a forward pitch-adjustment element 1330, a rearward pitch-adjustment element 1335, a barrel nut 1340, two barrel nut retention bolts 1345, a rearward plate 1350, and four fixating bolts 1355. A portion of the height-adjustment plate engages a slot 1360 in the tongue 1315 and abuts against the forward pitch-adjustment element 1330. Simultaneously, two toothed arc-shaped plates 1365 on the forward pitch-adjustment element 1330 engage two complementary toothed arc-shaped plates 1370 on the rearward pitch-adjustment element 1335. The barrel nut 1340 is disposed between the complementary toothed arc-shaped plates 1370 and is secured by the barrel nut retention bolts 1345 in combination with curved slots in the rearward pitch-adjustment element 1335 so that the barrel nut 1340 can describe an arc-shaped path. Finally, the rearward pitch-adjustment element 1335 is attached to the cup 1310 via the rearward plate 1350 and the four fixating bolts 1355.

In use, the adjustment bolt 1320 passes through the height-adjustment plate 1325 and the forward pitch-adjustment element 1330, and then threadably engages the barrel nut 1340. When loosened, the forward support 1305 may thereby be slid up and down in the slot 1360, and the relationship between the forward and rearward pitch-adjustment elements 1330, 1335 may be changed to affect the pitch of the forward support 1305. When the desired positioning is ultimately achieved, the adjustment bolt 1320 may be tightened to retain the desired position. Again, the forward support 1305 of the alternative bicycle saddle 1300 has adjustability in both height and pitch except that the alternative bicycle saddle 1300 relies on a single bolt (i.e., the adjustment bolt 1320) to lock in a desired position, while the previous alternative bicycle saddle 1200 relies on two bolts (i.e., the height-adjustment bolt 1220 and the pitch-adjustment bolt 1240).

All the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

Any element in a claim that does not explicitly state "means for" performing a specified function or "step for" performing a specified function is not to be interpreted as a "means for" or "step for" clause as specified in AIA 35 U.S.C. § 112(f). In particular, the use of "steps of" in the claims herein is not intended to invoke the provisions of AIA 35 U.S.C. § 112(f).

What is claimed is:

1. A bicycle saddle for use with a bicycle, the bicycle saddle comprising:
   a post;
   a connecting arm attached to the post;
   a seat attached to the connecting arm with the seat vertically higher than the post and being noseless; and
   a forward support attached to the connecting arm and comprising a cup-shaped element, the cup-shaped element adjustably positioned directly forward of a center of the seat and in spaced relation to the seat with the cup-shaped element opening towards the rear and being vertically elongate;
   wherein the cup-shaped element is adapted to press against a rider both lateral to the genitals of the rider and above the genitals of the rider while the rider is seated on the seat and peddling the bicycle.

2. The bicycle saddle of claim 1, wherein the seat comprises a seat pan covered at least in part by an elastic pad.

3. The bicycle saddle of claim 1, wherein the seat defines a pair of depressions.

4. The bicycle saddle of claim 1, wherein the forward support comprises a forward support horn protruding forward from the cup-shaped element.

5. The bicycle saddle of claim 4, wherein the cup-shaped element comprises a padded rim.

6. The bicycle saddle of claim 4, wherein the cup-shaped element defines a plurality of openings to allow ventilation.

7. The bicycle saddle of claim 1, wherein the connecting arm comprises a pair of primary rods.

8. The bicycle saddle of claim 7, further comprising an adjustable seat post bracket operative to attach the pair of primary rods to the post at least in part by clamping onto each of the pair of primary rods.

9. The bicycle saddle of claim 7, wherein the pair of primary rods extend parallel to each other for a majority of their extent.

10. The bicycle saddle of claim 7, wherein the seat defines a pair of seat rods that run parallel to one another.

11. The bicycle saddle of claim 10, further comprising:
    a seat support attached to the seat;
    a lower adjustable seat bracket positioned at one end of the seat support and operative to attach the seat support to the pair of primary rods at least in part by clamping onto each of the pair of primary rods; and
    an upper adjustable seat bracket positioned at the other end of the seat support and operative to attach the seat support to the seat at least in part by clamping onto each of the pair of seat rods.

12. The bicycle saddle of claim 7, further comprising an adjustable forward support bracket operative to attach the forward support to the pair of primary rods at least in part by clamping onto each of the pair of primary rods.

13. The bicycle saddle of claim 12, wherein:
    the forward support defines a curved slot and two curved guides; and
    the adjustable forward support bracket passes through the curved slot and engages the two curved guides.

14. A bicycle comprising:
    a post supported by the bicycle;
    a connecting arm attached to the post;
    a seat attached to the connecting arm with the seat vertically higher than the post and being noseless; and
    a forward support attached to the connecting arm and comprising a cup-shaped element, the cup-shaped element adjustably positioned directly forward of a center of the seat and in spaced relation to the seat with the cup-shaped element opening towards the rear and being vertically elongate;
    wherein the cup-shaped element is adapted to press against a rider both lateral to the genitals of the rider and above the genitals of the rider while the rider is seated on the seat and peddling the bicycle.

15. A bicycle saddle for use with a bicycle, the bicycle saddle comprising:
a post;
a primary connecting arm attached to the post;
a secondary connecting arm hingedly attached to the primary connecting arm;
a seat attached to the primary connecting arm with the seat vertically higher than the post and being noseless; and
a forward support attached to the secondary connecting arm and comprising a cup-shaped element, the cup-shaped element adjustably positioned directly forward of a center of the seat and in spaced relation to the seat with the cup-shaped element opening towards the rear and being vertically elongate;
wherein the cup-shaped element is adapted to press against a rider both lateral to the genitals of the rider and above the genitals of the rider while the rider is seated on the seat and peddling the bicycle.

16. The bicycle saddle of claim 15, further comprising:
a receiver attached to the secondary connecting arm; and
a sliding latch attached to the primary connecting arm;
wherein the secondary connecting arm, the primary connecting arm, the receiver, and the sliding latch are positionable such that the sliding latch engages the receiver to hold the secondary connecting arm in position relative to the primary connecting arm.

17. The bicycle saddle of claim 16, further comprising a cable attached to the sliding latch and operative to slide the sliding latch.

18. The bicycle saddle of claim 16, wherein the receiver is u-shaped.

* * * * *